(12) United States Patent
Ghit et al.

(10) Patent No.: US 12,399,901 B2
(45) Date of Patent: Aug. 26, 2025

(54) FETCHING QUERY RESULTS THROUGH CLOUD OBJECT STORES

(71) Applicant: Databricks, Inc., San Francisco, CA (US)

(72) Inventors: Bogdan Ionut Ghit, Amsterdam (NL); Juliusz Sompolski, Amsterdam (NL); Shi Xin, San Francisco, CA (US); Bart Samwel, Oegstgeest (NL)

(73) Assignee: Databricks, Inc., San Francisco, CA (US)

( * ) Notice: Subject to any disclaimer, the term of this patent is extended or adjusted under 35 U.S.C. 154(b) by 0 days.

(21) Appl. No.: 18/614,380

(22) Filed: Mar. 22, 2024

(65) Prior Publication Data

US 2024/0394271 A1 Nov. 28, 2024

Related U.S. Application Data

(63) Continuation of application No. 17/841,946, filed on Jun. 16, 2022, now Pat. No. 11,960,494.

(51) Int. Cl.
*G06F 16/2458* (2019.01)
*G06F 11/34* (2006.01)
(Continued)

(52) U.S. Cl.
CPC ...... *G06F 16/2471* (2019.01); *G06F 11/3419* (2013.01); *G06F 16/244* (2019.01); *G06F 16/256* (2019.01)

(58) Field of Classification Search
CPC .............. G06F 16/2471; G06F 11/3419; G06F 16/244; G06F 16/256; G06F 3/0605;
(Continued)

(56) References Cited

U.S. PATENT DOCUMENTS

| 11,567,735 B1 | 1/2023 | Kulkarni et al. |
| 2017/0220612 A1* | 8/2017 | Crossley ............... G06F 16/248 |

(Continued)

OTHER PUBLICATIONS

Baker, J. et al. "Megastore: Providing scalable, highly available storage for interactive services," CIDR, vol. 11, Jan. 9, 2011, 12 pages.
(Continued)

*Primary Examiner* — Dangelino N Gortayo
(74) *Attorney, Agent, or Firm* — Fenwick & West LLP

(57) ABSTRACT

The system is configured to: 1) receive a client request; 2) determine executor(s) to generate a response to the user request; 3) provide each of the executor(s) with an indication; 4) receive for each indication a response including an output of either a cloud output or an in-line output to generate a group of in-line outputs and a group of cloud outputs; 5) determine whether the group of in-line outputs comprises all outputs; and 6) in response to the group of in-line outputs not comprising all the outputs for the client request: a) convert the group of in-line outputs to a converted group of cloud outputs; b) generate metadata for the converted group of cloud outputs and the group of cloud outputs; and c) provide response to the client request including the metadata for the converted group of cloud outputs and the group of cloud outputs.

15 Claims, 14 Drawing Sheets

(51) Int. Cl.
*G06F 16/242* (2019.01)
*G06F 16/25* (2019.01)

(58) Field of Classification Search
CPC .... G06F 3/0611; G06F 3/0635; G06F 3/0659; G06F 3/067; H04L 67/10; H04L 67/1097
See application file for complete search history.

(56) References Cited

U.S. PATENT DOCUMENTS

| | | | |
|---|---|---|---|
| 2018/0349499 A1* | 12/2018 | Pawar | G06F 16/9536 |
| 2019/0364097 A1 | 11/2019 | Cheng et al. | |
| 2020/0145499 A1 | 5/2020 | Kaplan et al. | |
| 2020/0364211 A1* | 11/2020 | Li | G06F 16/2272 |
| 2022/0101438 A1* | 3/2022 | Gao | G06Q 30/0201 |
| 2022/0222256 A1* | 7/2022 | Tu | G06F 16/2282 |
| 2022/0300459 A1 | 9/2022 | Boshev et al. | |
| 2022/0345463 A1 | 10/2022 | Wu et al. | |
| 2023/0055241 A1 | 2/2023 | Zionpour et al. | |

OTHER PUBLICATIONS

Calder, B. et al. "Windows azure storage: a highly available cloud storage service with strong consistency," 23rd ACM Symposium on Operating Systems Principles, Oct. 23, 2011, 15 pages.

Hu, W. et al. "The good, the bad and the ugly of consumer cloud storage," ACM SIGOPS Operating Systems Review, vol. 44, No. 3, Aug. 17, 2010, 6 pages.

Varia, J. "Cloud architectures" White Paper of Amazon, Amazon Web Services, Jun. 2008, 14 pages.

United States Office Action, U.S. Appl. No. 17/841,946, filed Jun. 2, 2023, 15 pages.

* cited by examiner

FETCHING QUERY RESULTS THROUGH CLOUD OBJECT STORES

CROSS REFERENCE TO RELATED APPLICATIONS

This application is a continuation of prior, co-pending U.S. patent application Ser. No. 17/841,946, filed Jun. 16, 2022, which is incorporated herein in its entirety for all purposes.

BACKGROUND OF THE INVENTION

Cloud-based computation typically is accessed using a user facing control system. This control system coordinates submitted job requests and acts as a channel for the output of the job request. However, this can lead to the control system becoming a bottleneck especially in the event that the output of the job request is large and multiple users and jobs are receiving service from the control system.

BRIEF DESCRIPTION OF THE DRA WINGS

Various embodiments of the invention are disclosed in the following detailed description and the accompanying drawings.

DETAILED DESCRIPTION

Figure 1:
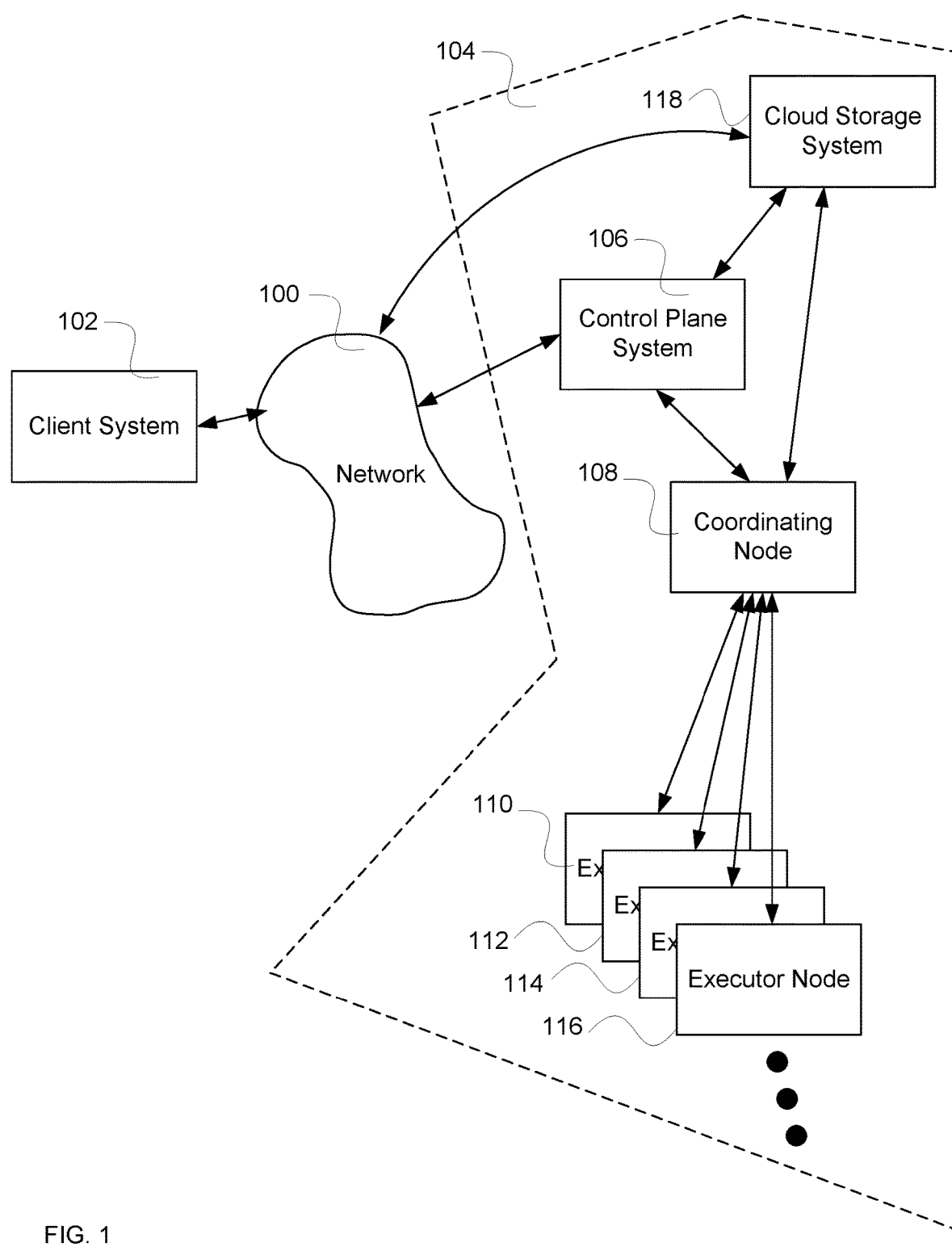
FIG. 1 is a diagram illustrating an embodiment of a system for fetching query results through cloud object stores.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for fetching query results through cloud object stores is disclosed. The system comprises a processor and a memory. The processor is configured to: receive a client request; determine one or more executors to generate a response to the user request; provide each of the one or more executors with an indication; receive for each indication a response including an output of either a cloud output or an in-line output to generate a group of in-line outputs and a group of cloud outputs; determine whether the group of in-line outputs comprises all outputs for the client request; in response to determining that the group of in-line outputs not comprising all outputs for the client request: a) convert the group of in-line outputs to a converted group of cloud outputs; b) generate metadata for the converted group of cloud outputs and the group of cloud outputs (e.g., generate metadata for the entire set of cloud outputs); and c) provide response to the client request including the metadata for the converted group of cloud outputs and the group of cloud outputs. The memory is coupled to the processor and configured to provide the processor with instructions. In some embodiments, the reference/pointers to the entire set of cloud outputs (e.g., part of the metadata) are stored in the memory.

In some embodiments, the system for fetching query results through cloud object stores enables direct and parallel access to output data for the client requesting results as stored in a cloud object store. The direct access for a client to outputs responding to the client request on a cloud storage system avoids a data access path through a control system (e.g., a control plane system). A client makes a request, and the system receives the request at a control system. The control system provides the request to a coordinating node to coordinate execution of jobs to generate a response for the client request. The coordinating node determines one or more executors for executing the jobs, and for each job, the coordinating node determines whether the output for the job will be all in-line outputs, a mix of in-line outputs and cloud outputs, or all cloud outputs. In-line outputs are selected for a job in the event that the outputs are relatively small, in which case supporting the overhead of storing the outputs (e.g., indexing, establishing and storing metadata, storing on the cloud storage system in a location indicated using the metadata, supporting client direct access using signed URLs, and removing output files after client access of the output files as indicated by metadata) is not efficient. The small amount of data associated with an in-line output can be efficiently passed through the control system without posing a problem of the control system becoming a bottleneck. So, for the situation in which all of the job outputs are in-line outputs, the job outputs will be passed back through the control system. However, for the situation in which not all of the job outputs are in-line outputs, the system enables a client to directly fetch the output data through a cloud storage system (e.g., a cloud object storage system). For the larger outputs, this enables avoiding the bottleneck of the control system. For the case in which all of the outputs for the job are designated as cloud outputs (e.g., that all the output files are large), then the efficiency of the direct fetching for the client is achieved. For the case in which some of the outputs are in-line outputs and some are cloud outputs, efficiency can be improved by gathering the in-line outputs into a cloud output file and adding that to the cloud storage system to be accessed and managed by the metadata as a larger unit. In some embodiments, the in-line outputs are gathered into a plurality of cloud output file. In some embodiments, the in-line outputs are compacted into one or more cloud output files.

In some embodiments, metadata regarding the output data for job output data is generated. For example, for a cloud output file returned from a job executed by an executor, a metadata entry is stored. In various embodiments, the metadata entry includes a client request identifier, a job identifier, a mapping information regarding how the cloud output is part of the total output responding to the client request (e.g., which columns of an output table the file stores, which rows of an output table the file stores, which table or area in a table the file stores, etc.), a creation date (e.g., to be used for determining a garbage collection date), a storage location on a cloud storage system, encryption key for decrypting the file, or any other appropriate information. In some embodiments, the metadata includes an indication of whether the file is compressed or not compressed. In some embodiments, the metadata includes a file size in bytes so that the client knows how to allocate buffers to load the data. In some embodiments, the metadata, a portion of the metadata, or data derived from the metadata is returned to the client that submitted the client request. The metadata, the portion of the metadata, or the data derived from the metadata is then used by client to request a transfer of the cloud output file(s) from the cloud storage system (e.g., by providing a request to transfer output data associated with a client request identifier). The cloud storage system responds to the request by providing pointers that can be used to transfer one or more of the cloud output files. For example, the cloud storage system provides a pointer (e.g., a URL with security token) to transfer a batch of cloud output files. In some embodiments, the cloud storage system sets a timer to monitor the time it takes to transfer the batch of cloud output files. In response to the batch transfer taking too long of a time (e.g., more than a threshold amount of time), the cloud storage system makes a next batch of cloud output files smaller (e.g., a percentage times the prior batch—for example, 50%, 30%, 25%, etc.—of the prior batch). In response to the batch transfer taking too short of a time (e.g., less than a threshold amount of time), the cloud storage system makes a next batch of cloud output files larger (e.g., a percentage—for example, 200%, 300%, 400%, etc.—of the prior batch). In some embodiments, the transfer of batches proceeds until all the cloud output files associated with the client request are transferred. In some embodiments, the cloud output files transferred include a cloud output file that is a group of in-line outputs that have been aggregated to form a cloud output file.

In some embodiments, the client system receives the metadata, the portion of the metadata, or the data derived from the metadata related to the client request, requests the transfer, and then assembles the transferred files into appropriate data structures. In various embodiments, the data structures comprise tables, summary results, data displayable as graphics or dashboards, models, or any other appropriate request result data structures.

In some embodiments, the system improves the computer by avoiding bottlenecking of cloud computation systems when transferring output data back to a requester. The system enables direct access to larger files from a cloud storage system. The system avoids inefficiencies associated with small output files by transferring a group of aggregated small output files or by directly transferring these smaller files back to a requestor.

FIG. 1 is a diagram illustrating an embodiment of a system for fetching query results through cloud object stores. In the example shown, client system 102 interfaces with cloud computation system 104 via network 100. In various embodiments, network 100 comprises one or more of a wired network, a wireless network, a local network, the internet, a wide area network, and/or any other appropriate network. Cloud computation system 104 comprises control plane system 106, coordinating node 108, executor nodes (e.g., executor node 110, executor node 112, executor node 114, executor node 116, etc.), and cloud storage system 118. Client system 102 requests to cloud computation system 104 to perform processing. Control plane system 106 receives the request and forwards the request to coordinating node 108. The request is broken into smaller jobs that are formed to executor nodes by coordinating node 108. Coordinating node 108 determines by analyzing the job assigned to an executor node whether the output of the job is an in-line output or a cloud output (e.g., whether the output file is small, an in-line output, or large, a cloud output). Coordinating node 108 then knows whether the processing of the request from the client has 1) all in-line outputs, 2) a mix of in-line outputs and cloud outputs, or 3) all cloud outputs. The jobs are distributed, and the outputs are received back at coordinating node 108. For the case of all in-line outputs, coordinating node 108 forwards all in-line outputs to client system 102 via control plane system 106 including metadata information generated to inform the client as to the structure of the data (e.g., identification for what each in-line output corresponds to). For the case of mixed in-line outputs and cloud outputs, coordinating node 108 gathers in-line outputs for storage on the cloud storage system along with the cloud storage outputs, creates metadata information to inform the client as to the structure of the data stored on the cloud storage system (e.g., identification for what each in-line output corresponds to, how to unpack the in-line storage outputs from an aggregated file, etc.), provides the metadata, portion of metadata, or information derived from the metadata to the client system so that the client system can fetch the output data responsive to the request, and assemble the output data into appropriate data structures. For the case of all cloud outputs, coordinating node 108 creates metadata information to inform the client as to the structure of the data stored on the cloud storage system (e.g., identification for what each cloud output corresponds to), provides the metadata, portion of metadata, or information derived from the metadata to the client system so that the client system can fetch the output data responsive to the request, and assemble the output data into appropriate data structures.

In some embodiments, coordinating node 108 provides metadata, portion of metadata, or information derived from metadata and in-line outputs (if appropriate—for example, when only in-line outputs are generated in response to the request) to client system 102 via control plane system 106. Client system 102, if the outputs are cloud based, uses metadata, portion of metadata, or information derived from metadata to request the output data from cloud storage system 118. Cloud storage system 118 receives the request and provides a link for accessing a batch of the files. Client system 102 uses the link to transfer the batch of files. In some embodiments, cloud storage system 118 tracks the time it takes to transfer the batch of files. In the case that the time is too long (e.g., greater than a threshold time), cloud storage system 118 will create a next batch of files that is smaller than the prior batch of files. In the case that the time is too short (e.g., less than a threshold time), cloud storage system 118 will create a next batch of files that is larger than the prior batch of files.

In some embodiments, client system 102 receives the in-line files or the batches of files and then reconstructs the output response using the metadata. Client system 102 is then able to provide data to client requestor.

Figure 2A:
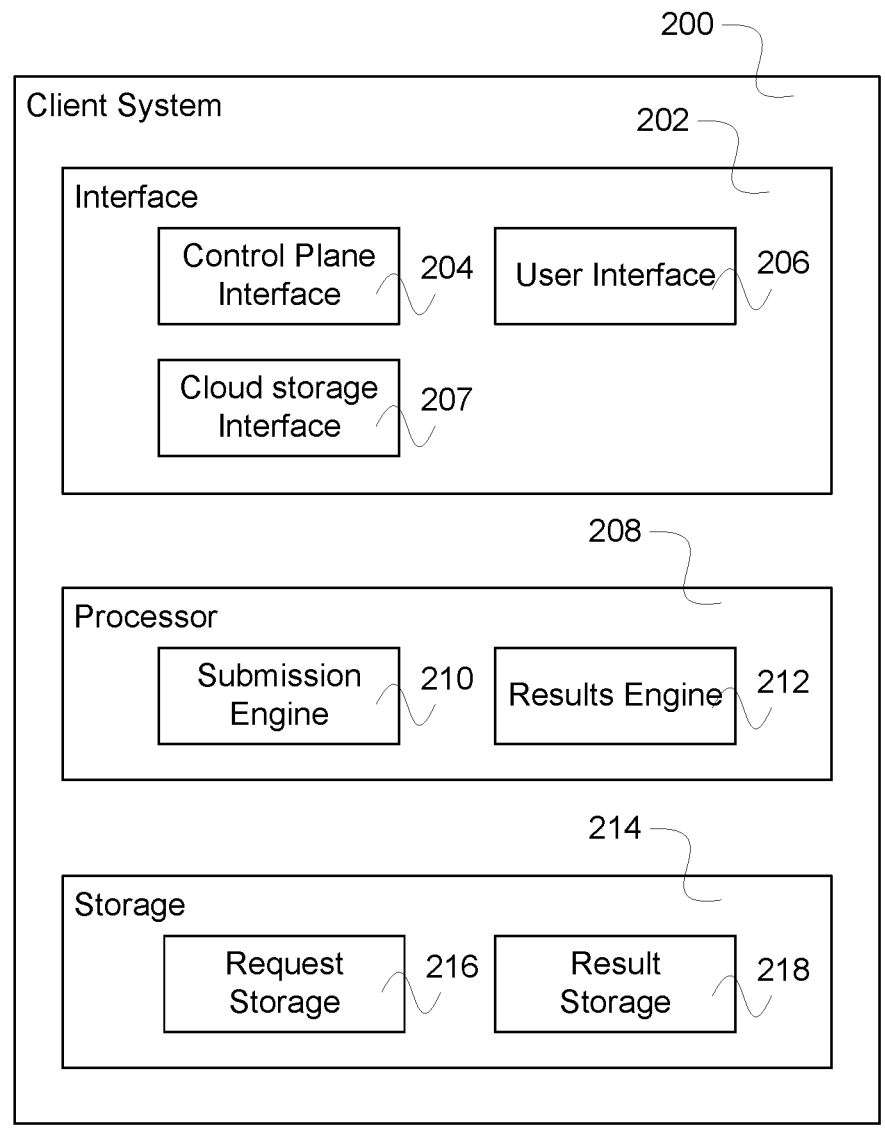
FIG. 2A is a diagram illustrating an embodiment of a client system.

FIG. 2A is a diagram illustrating an embodiment of a client system. In some embodiments, client system 200 comprises client system 102 of FIG. 1. In the example shown, client system 200 includes interface 202, processor 208, and storage 214. Interface 202 includes control plane interface 204, user interface 206, and cloud storage interface 207. A client interfaces with client system 200 via user interface 206 (e.g., a client request for processing and a client receipt of the output data responsive to the request). Client system 200 interfaces with a control plane system using control plane interface 204 (e.g., client system providing request for processing to control plane system and client system receiving metadata information and in-line outputs or a client system receiving metadata information related to cloud outputs). Client system 200 interfaces with a cloud storage system using cloud storage interface 207 (e.g., client system uses metadata information to retrieve and reconstruct output responsive to client request).

In some embodiments, processor 208 includes submission engine 210 and results engine 212. Submission engine 210 receives a client request and processes the client request to prepare for submission to a cloud computing system. In some embodiments, the submission steps to a cloud computing system are the steps needed for executing the query on a runtime system. The steps are as follows: 1) submission engine 210 determines whether the request can be handled using cloud storage and if the results can be compressed; submission engine 210 also applies a heuristic to blacklist queries that are likely to return with small results so it can bail out early from uploading; 2) submission engine 210 generates a query execution plan that includes the result serialization method (e.g., Arrow), compression library (e.g., LZ4), and a utility class for generating presigned URLs; the result serialization method, compression library, and utility class are used by tasks to transform the raw rows generated from computation to the appropriate cloud format and to upload them; 3) submission engine 210 creates a callback function that is used to collect results from the tasks; once results are collected, submission engine 210 resolves the result format to cloud or in-line. In some embodiments, the submission is provided to a control plane system. Results engine 212 receives information responsive to a request.

Results engine 212 receives in-line output(s) and metadata information or receives metadata information on how to retrieve cloud output(s). To retrieve cloud output(s), results engine 212 makes a request to cloud storage system based on metadata information and receives batches of files. Results engine 212 constructs output responsive to request based on received in-line output(s) or received batches of files that comprise the cloud output(s). In some embodiments, some of the batches of files include in-line output that has been aggregated to create a cloud output. In some embodiments, results engine 212 generated output is provided to a client via user interface 206.

In some embodiments, storage 214 includes request storage 216 and results storage 218. Request storage 216 stores data and instructions related to one or more client requests for processing. In various embodiments, one or more of input data, submission data, instructions, or any other appropriate request related data are stored related to a request. Results storage 218 stores data and metadata related to one or more requests results. In various embodiments, one or more of in-line outputs, cloud outputs, metadata information are stored related responsive to a request, or any other appropriate result data.

Figure 2B:
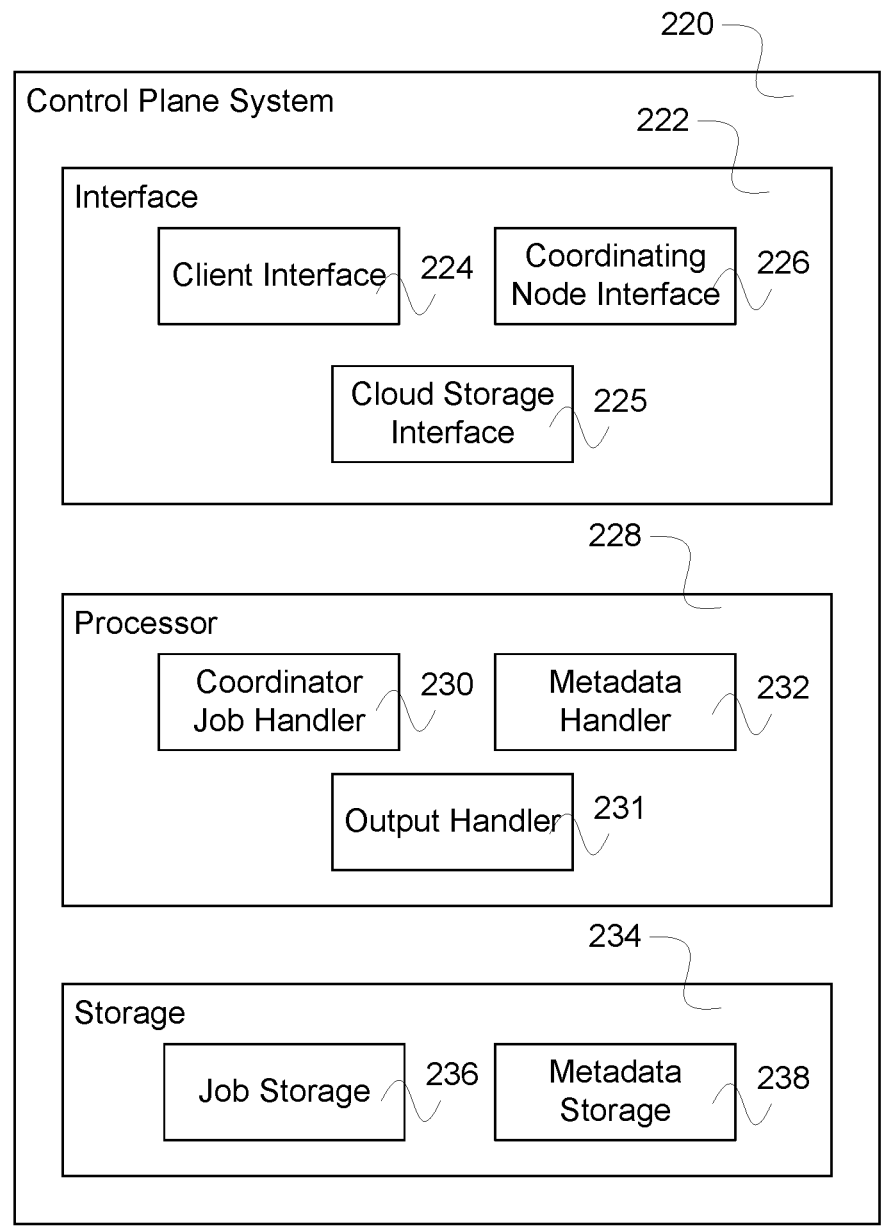
FIG. 2B is a block diagram illustrating an embodiment of a control plane system.

FIG. 2B is a block diagram illustrating an embodiment of a control plane system. In some embodiments, control plane system 220 comprises control plane system 106 of FIG. 1. In the example shown, control plane system 220 includes interface 222, processor 228, and storage 234. Interface 222 includes client interface 224, coordinating node interface 226, and cloud storage interface 225. Control plane system 220 receives a request from a client system using client interface 224. Control plane system 220 provides the request to a coordinating node system using coordinating node interface 226. Control plane system 220 receives results related to the request using coordinating node interface 226 from the coordinating node. Control plane system 220 communicates with cloud storage system using cloud storage interface 225. In some embodiments, a fetch request is relayed to the cloud storage system via control plane system 220. The cloud storage system provides the client system a link in response to the fetch request that enables direct transfer of data from the cloud storage system without the control plane system intermediating.

In some embodiments, processor 228 includes coordinator job handler 230, metadata handler 232, and output handler 231. Coordinator job handler 230 processes of a client request and creates a submission for the request to a coordinating node of a cloud computation system (e.g., a cluster system). Metadata handler 232 processes a received metadata and provides the appropriate metadata to the client in order for output data to be understood. In various embodiments, metadata includes information related to the structure of the output files (e.g., in-line outputs, cloud outputs, relation of the outputs to the request, data location, job information, etc.), the location of the output files (e.g., cloud storage system location), or any other appropriate information. Output handler 231 passes on in-line outputs (e.g., if all in-line outputs for a response to the request) to a client system.

In some embodiments, storage 234 includes job storage 236 and metadata storage 238. Job storage 236 stores data and instructions related to a client request. Metadata storage 238 stores metadata information related to responses to the request. For example, metadata storage 238 includes storage of job identifier(s), request identifier, storage location, mapping of outputs to response data structures, etc.

Figure 2C:
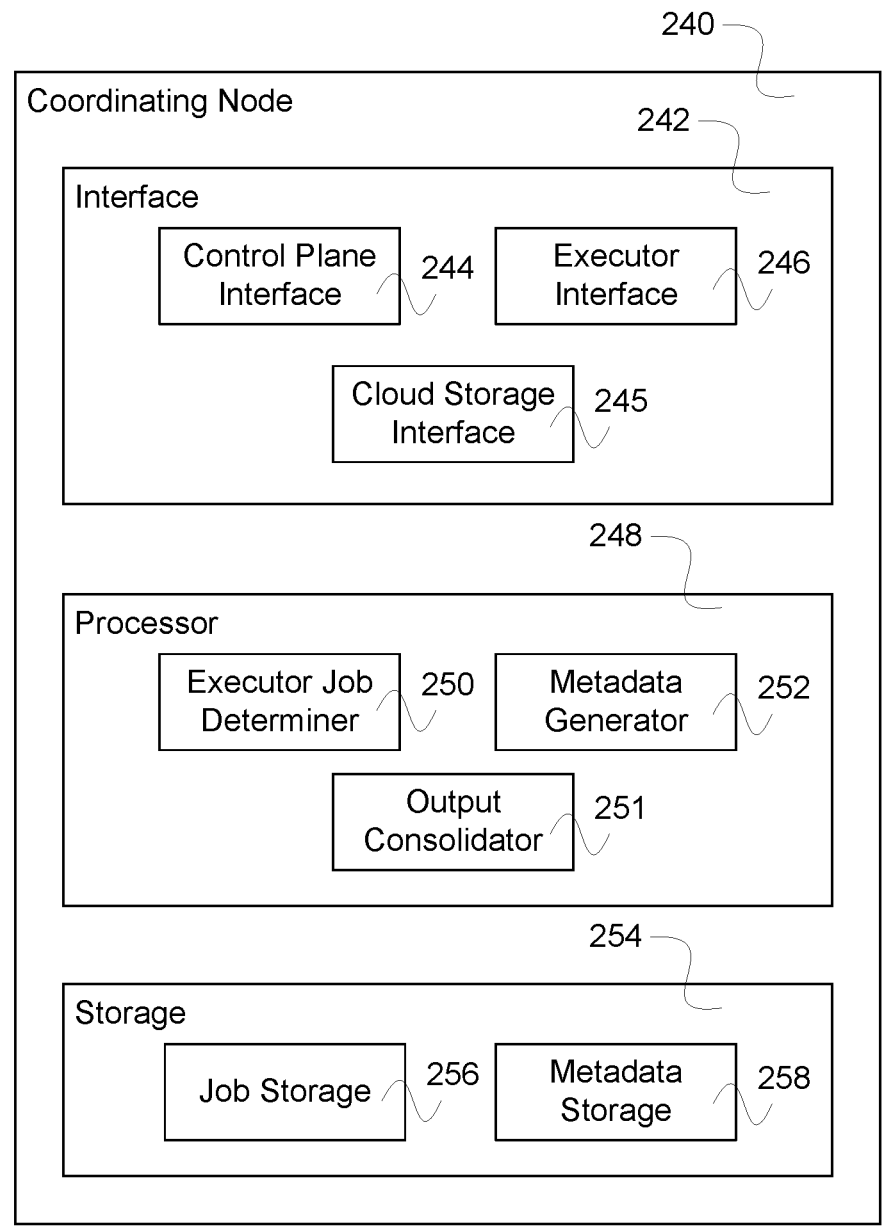
FIG. 2C is a diagram illustrating an embodiment of a coordinating node.

FIG. 2C is a diagram illustrating an embodiment of a coordinating node. In some embodiments, coordinating node 240 is used to implement coordinating node 108 of FIG. 1. In the example shown, coordinating node 240 includes interface 242, processor 248, and storage 254. Interface 242 includes control plane interface 244, executor interface 246, and cloud storage interface 245. Coordinating node 240 receives a client request from control plane system using control plane interface 244 for processing and determines job(s), executor node(s), output type(s) for each of the job(s). In some embodiments, to determine the jobs needed to run the request the steps comprise: 1) the Apache Spark dataframe API is used to compile and to generate the compiled code that will execute on tasks; the computation of the final result is represented by an in-memory dataset called Resilient Distributed Dataset (RDD) which includes multiple partitions each of which uses the same compiled code to compute a subset of the final result; and 2) one special case here is queries that have LIMIT clauses; these queries are optimized by launching successive jobs with an exponentially increasing number of computed partitions; in this way, the amount of computation performed is minimized to retrieve exactly the LIMIT number of rows. In some embodiments, to determine the executor nodes the steps comprise: 1) an internal scheduler of a runtime engine is used to allocate the tasks generated by the SQL compiler on compute slots (CPU cores) from the cluster machines; and 2) the executor nodes are selected based on availability and on the scheduling policy being used (e.g., a processor-sharing technique called FAIR that balances the amount of slots allocated across running jobs). In some embodiments, to determine the output type the steps comprise: 1) protocol versioning is used to determine the session capabilities, namely the ability to use cloud fetch; on opening a session, the client and the cloud storage system negotiate the protocol version to use (e.g., the minimum supported version both support, the maximum version both support, etc.); 2) in addition, the client can use the protocol request fields to advertise its ability to download results and to decompress them; 3) the cloud storage system verifies that all conditions are met by the client and that the cloud storage system-side feature flags for cloud fetch are properly enabled; 4). the cloud storage system generates the query plan to determine whether there are specific SQL commands such as data definition language commands (DDLs) (e.g., CREATE TABLE, OPTIMIZE) that will most certainly generate tiny results, if any; the cloud storage system also checks if the plan includes a global aggregation; in all such cases, the cloud storage system decides to fallback to in-line results; 5) the cloud storage system executes the query; and 6) when results are collected, the cloud storage system further resolves hybrid results to the appropriate result format: small results (e.g., results <5 MB) are designated as in-line (e.g., in-line output), otherwise they are designated as cloud fetched (e.g., cloud output). Coordinating node 240 provides job(s) to executor(s) using executor interface 246. Coordinating node 240 receives job output(s) from executor(s) using executor interface 246. Coordinating node 240 provides cloud output(s) to cloud storage system using cloud storage interface 245. Coordinating node 240 aggregates in-line outputs to store on the cloud storage system in the event that a job has both cloud outputs and in-line outputs.

In some embodiments, processor 248 includes executor job determiner 250, metadata generator 252, and output consolidator 251. Executor job determiner 250 determines smaller jobs for an executor to process the entire job responsive to the client request. Executor job determiner 250 also determines output type for each job and therefore for the client request. For example, the jobs for the client request are 1) all in-line output type, 2) a mix of in-line output type and cloud type, or 3) all cloud output type. In response to the jobs being a mix of in-line output type, the in-line outputs will be aggregated, using output consolidator 251 to create a cloud output for the in-line parts and stored along with the cloud outputs for direct fetching of the outputs to a client system. Metadata generator 252 generates metadata information related to the outputs from executors. For example, metadata information includes information related to the structure of the outputs and their relations (e.g., the type of data, the relationship of outputs to each other—for example, portions of a table, columns of a table, rows of a table, portions of a model, etc.). In various embodiments, metadata information includes identifiers (e.g., request identifier, job identifiers, client identifier, cloud storage identifier, executor identifier, etc.), data locations (e.g., cloud storage system locations, file names, directories, etc.), labels (e.g., table names, row names, column names, model names, etc.), encryption key information (e.g., key value, key location, etc.), or any other appropriate information. In some embodiments, the metadata that is associated with a task result includes a sequence of result information. It is a sequence because a single task may generate multiple Arrow batches (e.g., the in-lined result format that serializes multiple result rows) or multiple Cloud Files. In some embodiments, the Arrow batch result includes one or more of the following metadata: number of rows, size in bytes (compressed and/or uncompressed), array [byte]—the actual result. In some embodiments, the cloud file results include one or more of the following metadata: number of rows, size in bytes (compressed and/or uncompressed), upload count (e.g., an internally used count to detect whether some of the upload attempts have failed), a URL link. In some embodiments, the cloud file includes metadata (e.g., a result schema that can be used to deserialize the result by the client).

In some embodiments, storage 254 includes job storage 256 and metadata storage 258. Job storage 256 stores information related to jobs for processing a client request (e.g., input data, instructions, code, job data, job breakdowns, executor assignments, output types, etc.). Metadata storage 258 stores information related to outputs received in response to the executor jobs (e.g., in-line outputs, cloud outputs prior to transfer to cloud storage system, etc.).

Figure 2D:
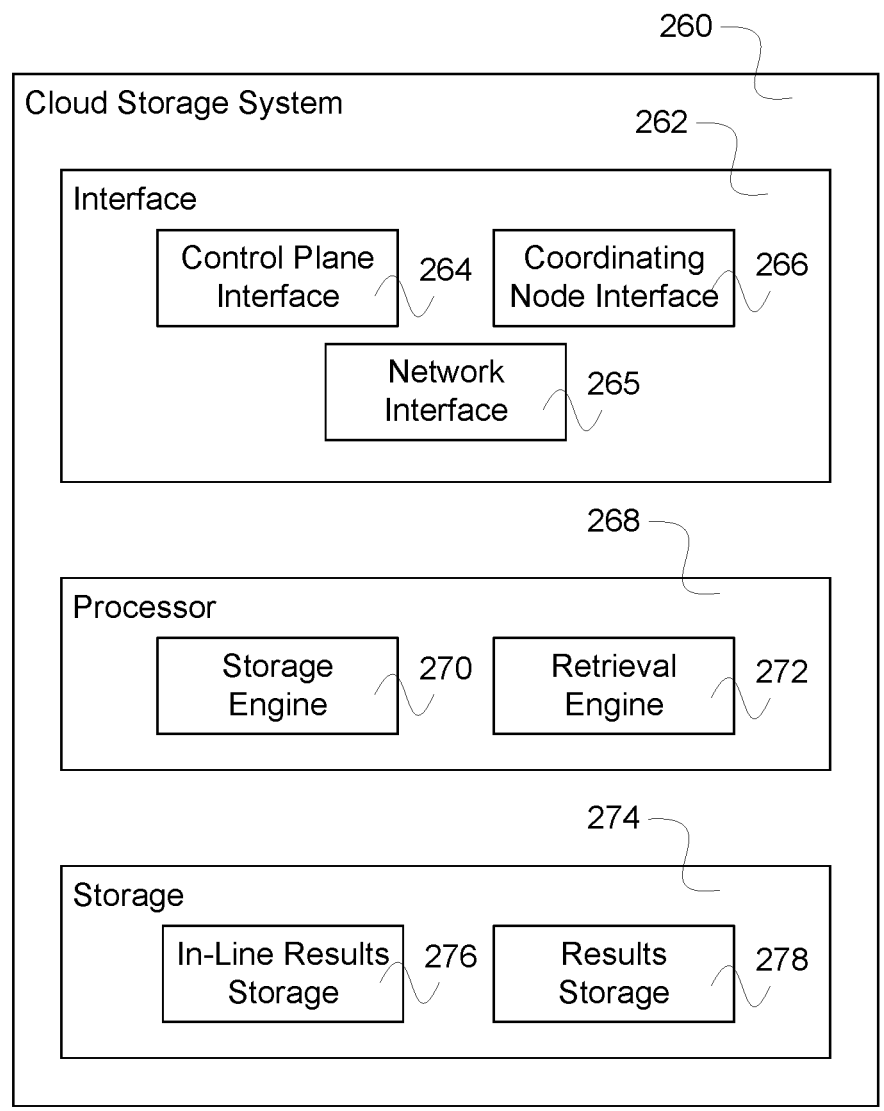
FIG. 2D is a diagram illustrating an embodiment of a cloud storage system.

FIG. 2D is a diagram illustrating an embodiment of a cloud storage system. In some embodiments, cloud storage system 260 is used to implement cloud storage 118 of FIG. 1. In the example shown, cloud storage system 260 includes interface 262, processor 268, and storage 274. Interface 262 includes control plane interface 264, coordinating node interface 266, and network interface 265. Cloud storage system 260 receives fetch request information via control plane interface 264 and provides a link (e.g., a URL) to directly retrieve output files from cloud storage system 260. Cloud storage system 260 receives cloud outputs and aggregated in-line outputs for storage from coordinating node using coordinating node interface 266. In some embodiments, coordinating node also generates and may provide metadata information for storage on cloud storage system 260. Cloud storage system 260 receives request (e.g., a URL) for fetching data via network interface 265 for outputs related to a client request.

In some embodiments, processor 268 includes storage engine 270 and retrieval engine 272. Storage engine 270 stores cloud outputs or aggregated in-line outputs and provides storage locations and pointer/indexing information back to coordinating node so that this information can be included in metadata associated with the cloud outputs or aggregated in-line outputs. Retrieval engine 272 provides batches of files in response to a request to fetch data from a client system. Retrieval engine 272 manages the creation of batches to not overwhelm the transfer of the files to the client system (e.g., large batches for fast transfers, smaller batches for slow transfers, etc.).

In some embodiments, storage 274 includes in-line results storage 276 and results storage 278. In-line results storage 276 stores aggregated in-line outputs. Results storage 278 stores cloud outputs.

Figure 2E:
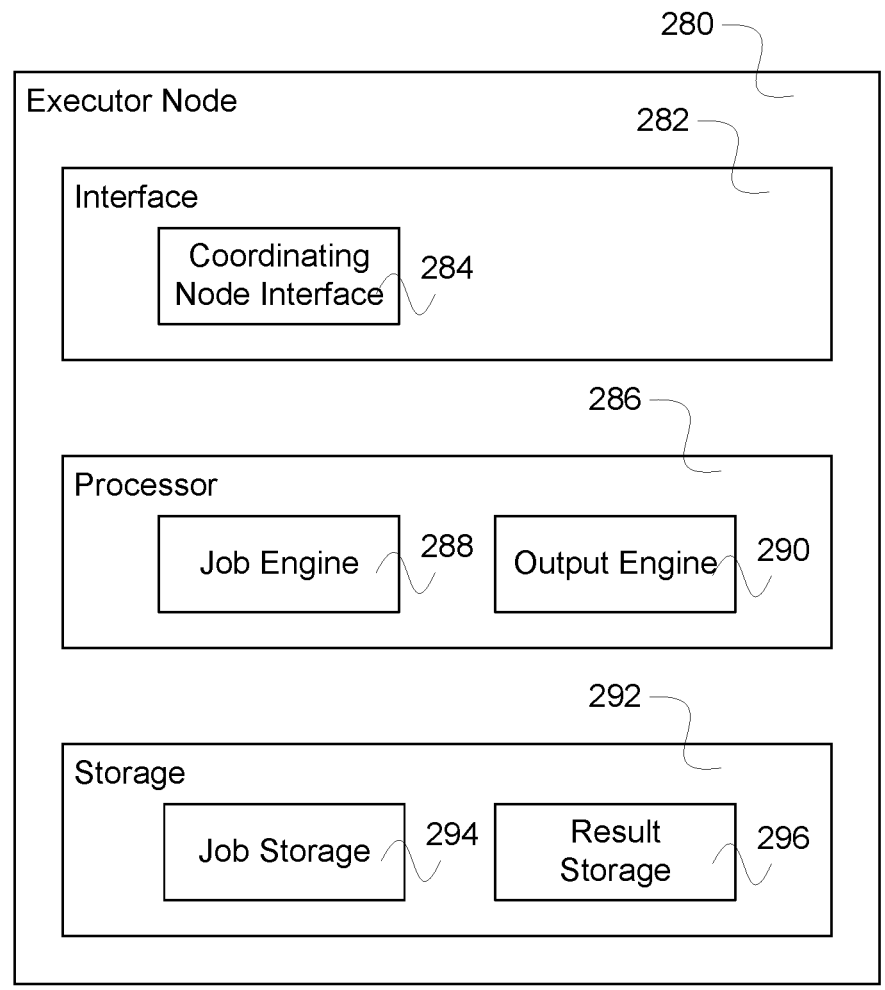
FIG. 2E is a diagram illustrating an embodiment of an executor node.

FIG. 2E is a diagram illustrating an embodiment of an executor node. In some embodiments, executor node 280 is used to implement executor node 110, executor node 112, executor node 114, and/or executor node 116 of FIG. 1. In the example shown, executor node 280 includes interface 282, processor 286, and storage 292. Interface 282 includes coordinating node interface 284 for receiving a job and for providing output results to a coordinating node. Processor 286 includes job engine 288 and output engine 290. Job engine 288 processes job received from coordinating node. Output engine 290 provides output of job to coordinating node. Storage 292 includes job storage 294 and results storage 296. Job storage 294 includes input data, job data, instruction data, temporary job storage, or any other appropriate job data. Results storage 296 stores result data for job including in-line results or outputs and large files for cloud storage or cloud outputs.

Figure 3:
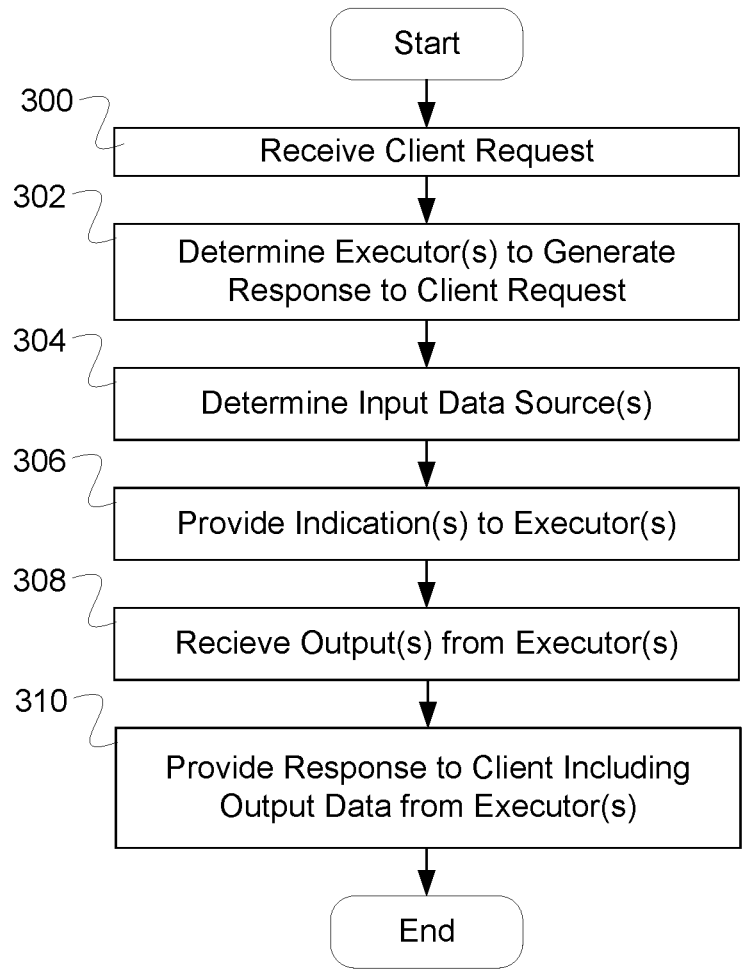
FIG. 3 is a flow diagram illustrating a process for a cloud computation system for a client request.

FIG. 3 is a flow diagram illustrating a process for a cloud computation system for a client request. In some embodiments, the process of FIG. 3 is executed by cloud computation system 104 of FIG. 1. In the example shown, in 300 a client request is received. For example, a client provides a request to execute a query, a model, or other instructions, and this request is received by a cloud computation system. In 302, executor(s) are determined to generate a response to the client request. For example, the system breaks the request into smaller executable jobs and determines the system elements (e.g., executors) to execute processing for these jobs. In 304, input data source(s) are determined. For example, the input data sources required for the processing of the request and/or for each of the jobs to complete the request are determined. In 306, indication(s) is/are provided to the executor(s). For example, an indication (e.g., a processing job submission) is determined for each of the executors required to complete the processing for the request. In 308, output(s) are received from the executor(s). For example, at least one output is received from each executor after having completed their job and these outputs. In 310, the response is provided to the client including the output data from executors. For example, output data is provided directly in response to a client request or output data is provided via metadata information that enables the client to download from a storage system to avoid system bottlenecks.

Figure 4A:
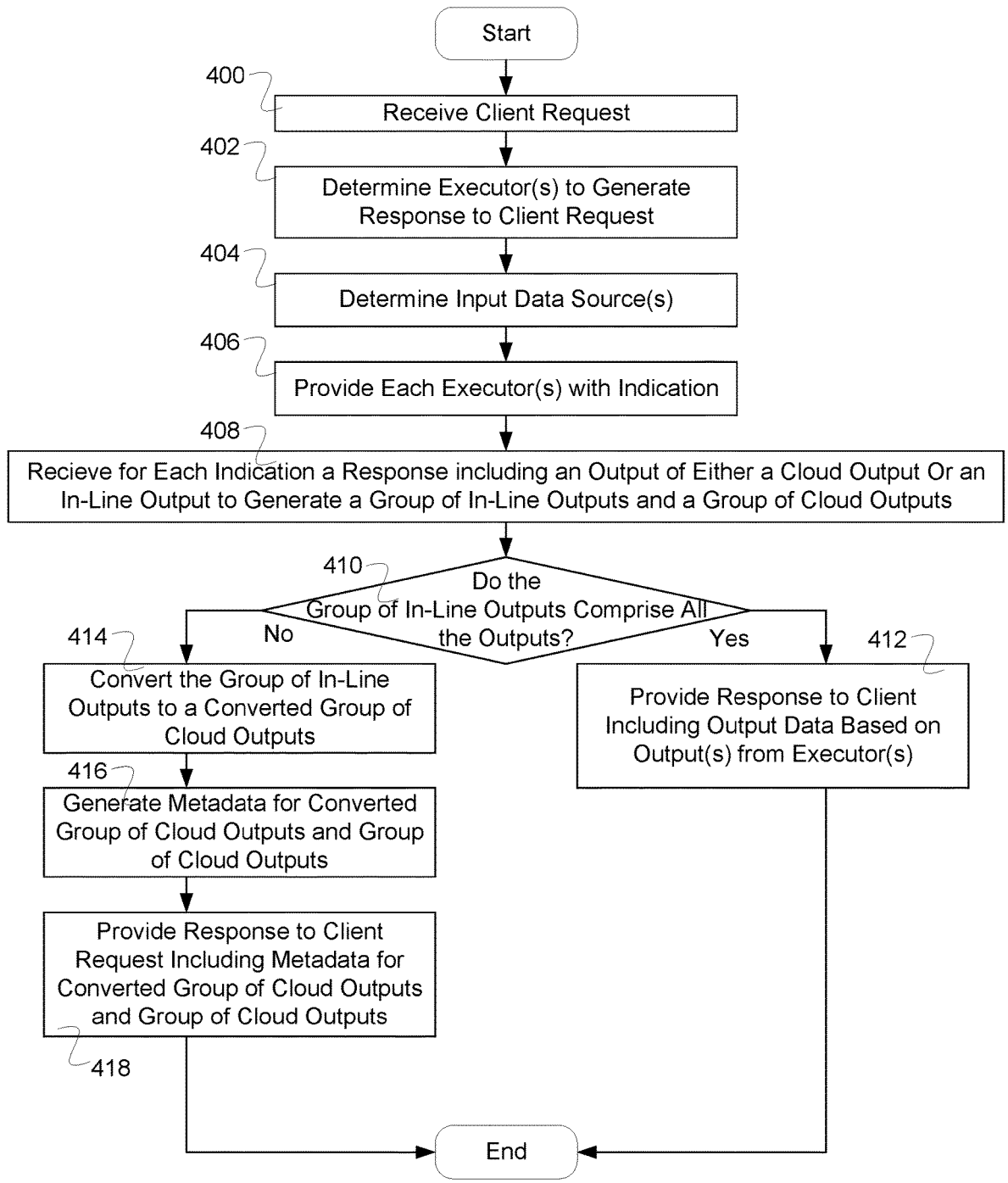
FIG. 4A is a flow diagram illustrating a process for cloud computation system for a client request.

FIG. 4A is a flow diagram illustrating a process for cloud computation system for a client request. In some embodiments, the process of FIG. 4A is executed by cloud computation system 104 of FIG. 1. In the example shown, in 400 a client request is received. For example, a client provides a request to execute a query, a model, or other instructions, and this request is received by a cloud computation system. In 402, executor(s) are determined to generate a response to the client request. For example, the system breaks the request into smaller executable jobs and determines the system elements (e.g., executors) to execute processing for these jobs. In 404, input data source(s) are determined. For example, the input data sources required for the processing of the request and/or for each of the jobs to complete the request are determined. In 406, each executor is provided with an indication. For example, an indication (e.g., a processing job submission) is determined for each of the executors required to complete the processing for the request. In 408, a response is received for each indication including an output of either a cloud output or an in-line output to generate a group of in-line outputs and a group of cloud outputs. For example, an executor returns at least one output, where the type of each output is either an in-line output or a cloud output. When the outputs for all the jobs associated with the client request are taken together, the outputs are either all in-line outputs (e.g., the outputs are all in the group of in-line outputs), a mix on in-line outputs and cloud outputs (e.g., some of the outputs are in the group of in-line outputs and some of the outputs are in the group of cloud outputs), or all cloud outputs (e.g., the outputs are all in the group of cloud outputs). In 410, it is determined whether the group of in-line outputs comprise all the outputs. In response to the group of in-line outputs comprising all the outputs, in 412, a response is provided to the client including output data based on output(s) from executor(s), and the process ends. For example, the in-line outputs are passed through the system directly to the client as the outputs are small enough not to overload the system. In response to the group of in-line outputs not comprising all the outputs, in 414 the group of in-line outputs is converted to a converted group of cloud outputs. For example, in the case where not all of the outputs are in-line outputs, the system aggregates any in-line outputs to be stored along with the cloud output in the cloud storage system. In 416, metadata is generated for the converted group of cloud outputs and the group of cloud outputs. For example, information is gathered and stored as metadata enabling identification, decoding, reconstructing, decrypting, etc. the output data responsive to the client request. In 418, a response is provided to the client request including the metadata for the converted group of cloud outputs and the group of cloud outputs, and the process ends.

Figure 4B:
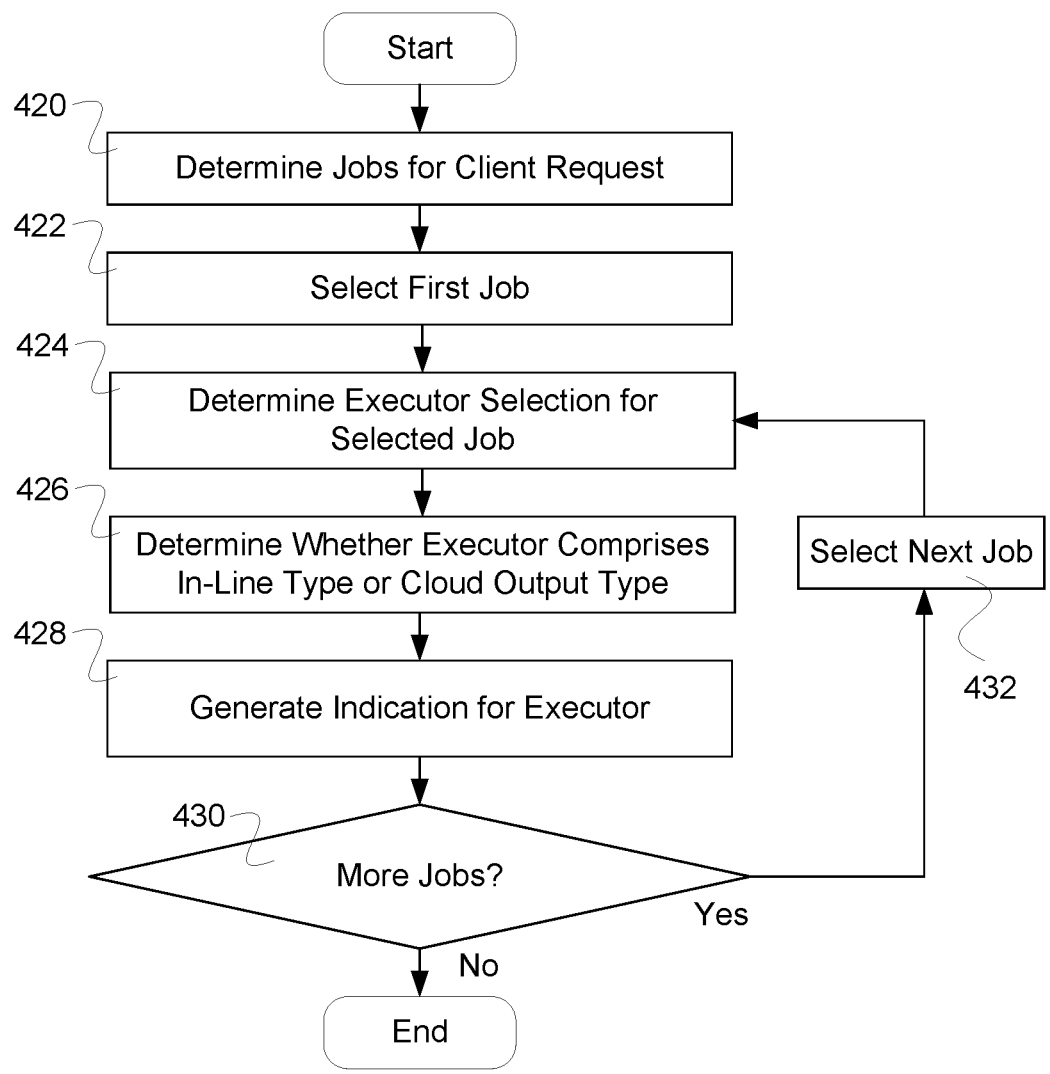
FIG. 4B is a flow diagram illustrating an embodiment of a process for determining an indication for executors.

FIG. 4B is a flow diagram illustrating an embodiment of a process for determining an indication for executors. In some embodiments, the indication determined the process of FIG. 4B is used to generate the indication provided to executors in 406 of FIG. 4A. In the example shown, in 420, jobs are determined for client request. For example, the client request is broken into smaller jobs. In some embodiments, breaking the client request into smaller jobs is performed using an SQL planner to compile an execution plan that is split into tasks (atomic units of execution each running on a compute slot/core). The planner can generate multiple intermediate stages to compute the final result. Each stage comprises multiple homogenous tasks. It also uses a partitioning scheme to split the output result across multiple result tasks. In 422, a first job is selected. In 424, an executor selection is determined for a selected job. In 426, it is determined whether the executor comprises an in-line type or a cloud output type. For example, it is determined whether the output is small and so is considered in-line type and can be returned directly to the client or that the output is large and so is considered cloud output type and is to be returned using a fetch link to the client. Each executor uses an heuristic to determine whether the result is small or large. In our case, we use a threshold of 5 MB by default. So, each task running on an executor buffers the results in memory. If they are less than 5 MB, then they return in-line. Otherwise, they are spilled to cloud. In 428, an indication is generated for the executor. For example, an indication indicating a job for an executor including input data, output data type, processing instructions, identifier (e.g., client identifier, request identifier, job identifier, etc.), decryption key, etc. In 430, it is determined whether there are more jobs. In response to there being more jobs, control passes to 432. In 432, a next job is selected, and control passes to 424. In response to there being no more jobs, the process ends.

In some embodiments, a query comprises a client request that needs to be executed. In some embodiments, a job comprises the execution plan of the query that comprises multiple stages each of which computes an intermediate result. In some embodiments, a task comprises an atomic unit of execution. In some embodiments, multiple identical tasks (e.g., a plurality of tasks where each task performs the same computation) form a stage.

Figure 4C:
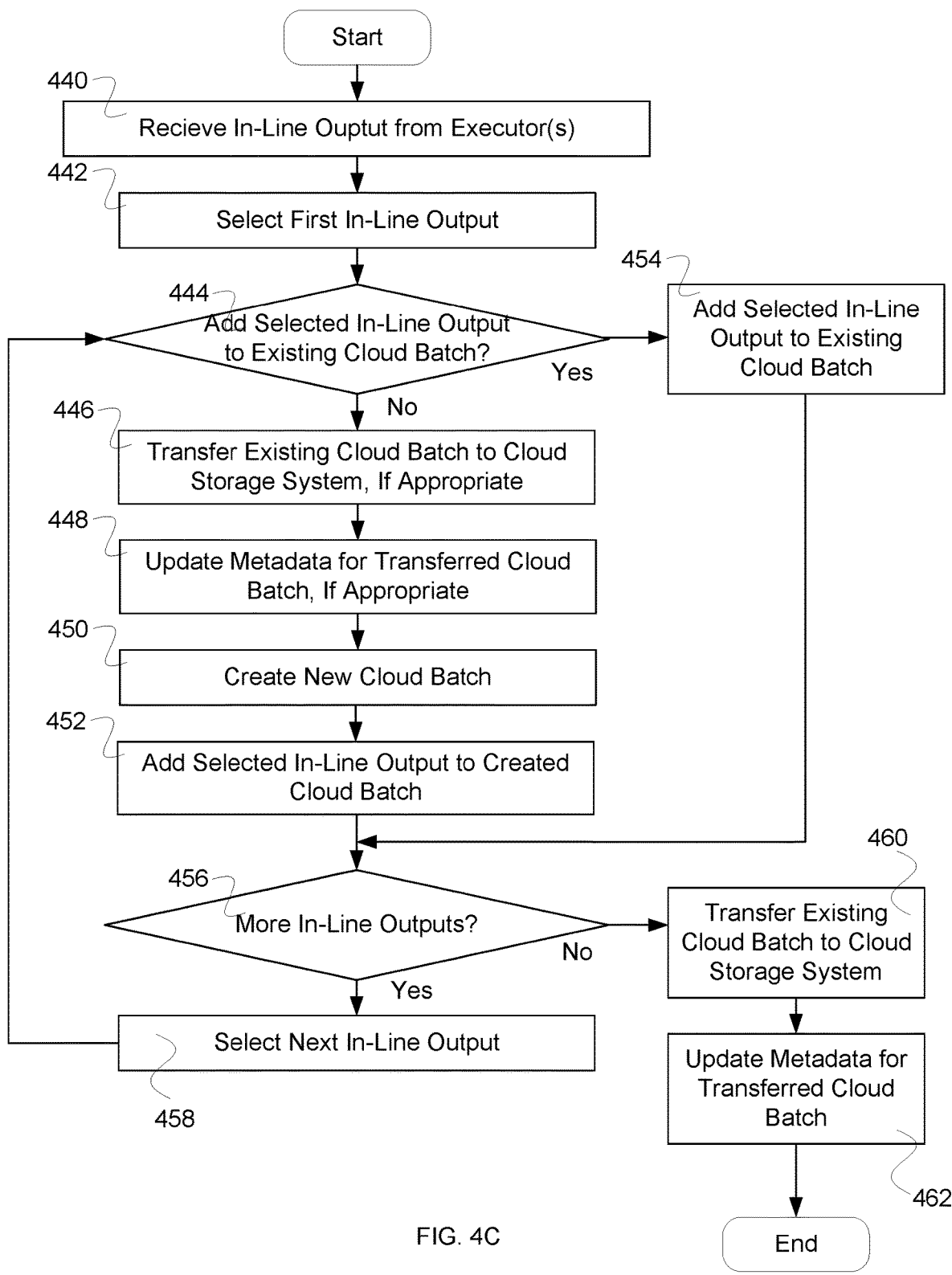
FIG. 4C is a flow diagram illustrating an embodiment of a process for converting in-line outputs.

FIG. 4C is a flow diagram illustrating an embodiment of a process for converting in-line outputs. In some embodiments, the process of FIG. 4C is used to implement 414 of FIG. 4A. In the example shown, in 440, an in-line output is received from executor(s). In 442, a first in-line output is selected. In 444, it is determined whether the selected in-line output is to be added to an existing cloud batch. In response to determining that the selected in-line output is to be added to an existing cloud batch, in 454 the selected in-line output is added to the existing cloud batch, and control passes to 456. In response to determining that the selected in-line output is not to be added to an existing cloud batch, in 446, an existing cloud batch is transferred to a cloud storage system, if appropriate. For example, if there is an existing cloud batch, then transfer this to the cloud storage system. In 448, metadata is updated for the transferred cloud batch, if appropriate. For example, if the existing cloud batch was transferred to the cloud storage system, then update the metadata related to the client request to include information related to the transferred cloud batch. In 450, create a new cloud batch. In 452, the selected in-line output is added to the created cloud batch. In 456, it is determined whether there are more in-line outputs. In response to there being more in-line outputs, in 458 a next in-line output is selected, and control passes to 444. In response to there not being more in-line outputs, in 460 the existing cloud batch is transferred to the cloud storage system. In 462, metadata is updated for the transferred cloud batch, and the process ends.

Figure 5:
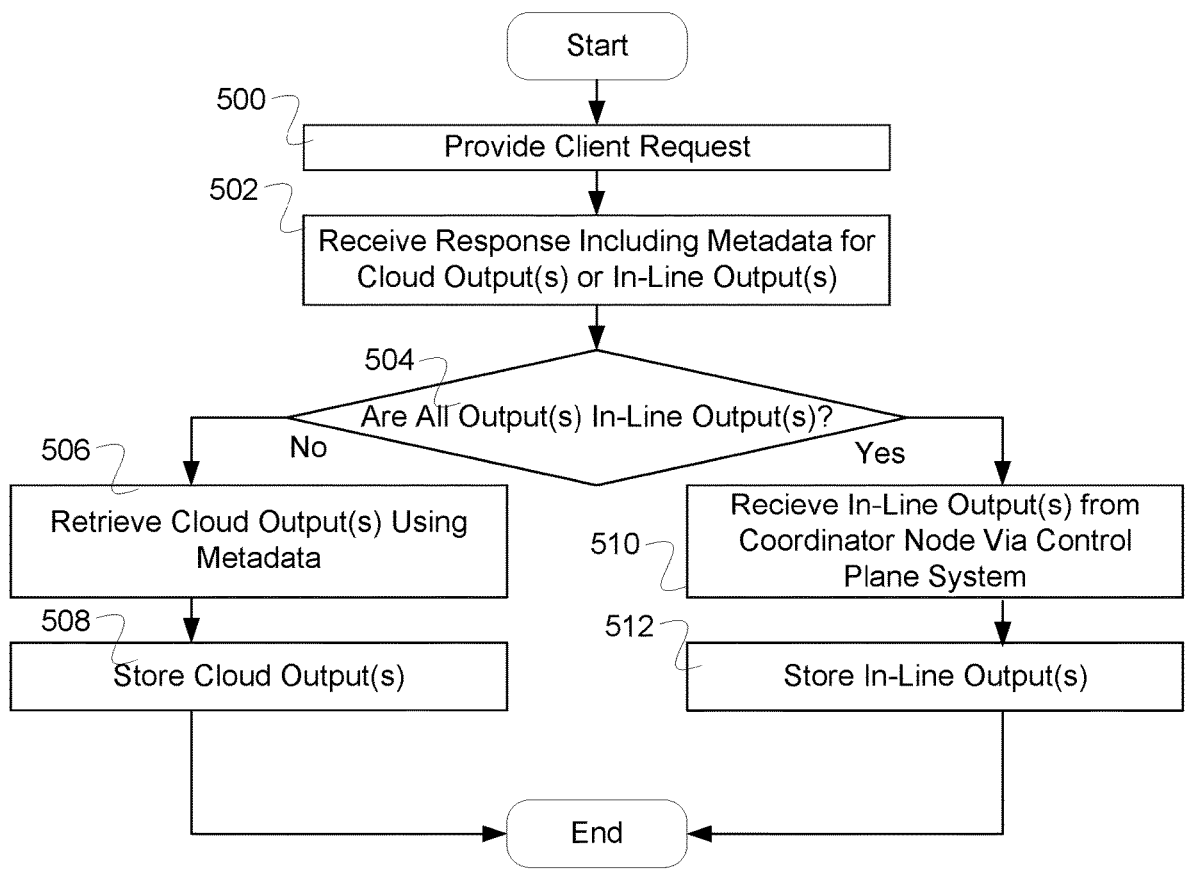
FIG. 5 is a flow diagram illustrating an embodiment of a process for a client system.

FIG. 5 is a flow diagram illustrating an embodiment of a process for a client system. In some embodiments, the process of FIG. 5 is executed by client system 102 of FIG. 1. In the example shown, in 500 a client request is provided. For example, a client creates a processing submission to process data (e.g., a set of code instructions, a database inquiry, a model run on input data, etc.), and provides the request to a cloud computing system. In 502, a response is received including metadata for cloud output(s) or in-line output(s). For example, the cloud computing system completes the processing required to respond to the client request and provide metadata to the client, where the metadata provides information about the structure of the response outputs (e.g., table information, graph information, model information, etc.). In 504, it is determined whether the output(s) are all in-line output(s). For example, it is determined whether the cloud computing system has returned a set of short in-line output(s) or a set of cloud output(s) that can be transferred using a link (e.g., a URL). In response to determining that the output(s) are all in-line output(s), in 510 in-line output(s) are received from the coordinating node via the control plane system. For example, the executor node output(s) responsive to the client request are assembled (e.g., by the coordinating node) and then forwarded via the control plane system back to the client system. In 512, the in-line outputs are stored, and the process ends. For example, the client system stores the in-line outputs and uses the metadata information received to identify and structure the data for the client to access and view. In response to determining that the output(s) are not all in-line output(s) (e.g., that the outputs are all cloud outputs), in 506, cloud output(s) are retrieved using metadata. For example, the metadata indicates a way to initiate a process for transferring the output(s) stored on a cloud storage system. In some embodiments, the client system indicates to the cloud storage system that a transfer of the output(s) is desired, and the cloud storage system creates link(s) that can be used to transfer the output(s) from the cloud storage system directly. In some embodiments, the link comprises a URL that includes authentication information and/or time limitations. In some embodiments, the link(s) are associated with batches of files to be transferred from the cloud storage system. In some embodiments, the batch size is changed if the time for transfer of a previous batch is too long or too short so that the batches are increased if the transfer went quickly and decreased if the transfer went slowly.

Figure 6:
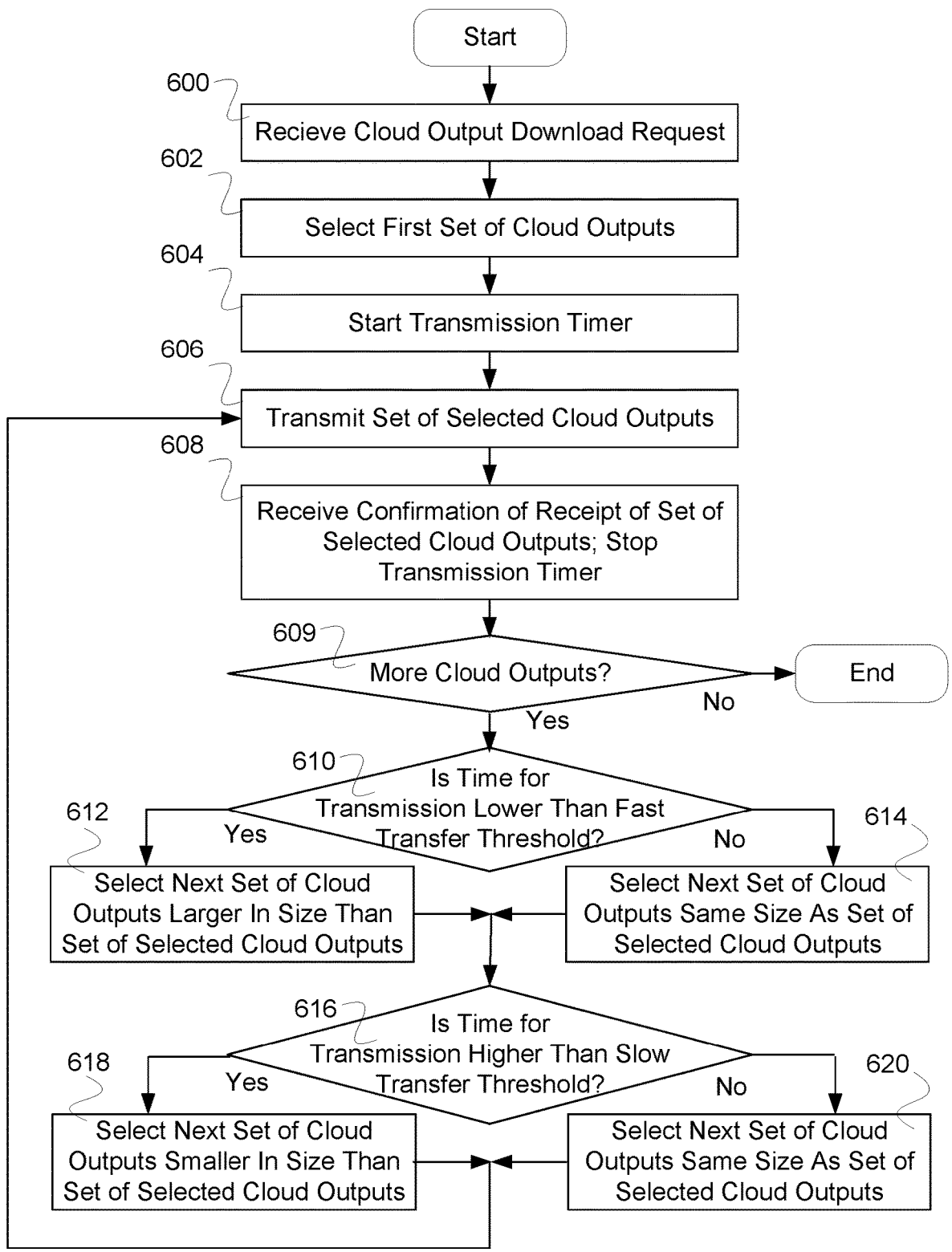
FIG. 6 is a flow diagram illustrating an embodiment of a process for cloud storage system.

FIG. 6 is a flow diagram illustrating an embodiment of a process for cloud storage system. In some embodiments, the process of FIG. 6 is executed by cloud storage system 118 of FIG. 1. In the example shown, in 600, a cloud output download request is received. For example, a request for transfer is received from a client system (e.g., via a control plane system) regarding a client request. In 602, a first set of cloud outputs is selected. In 604, a transmission timer is started. In 606, a set of selected cloud outputs is transmitted. For example, a batch of cloud outputs associated with the client request are selected for transfer. In 608, a confirmation of receipt is received of the set of selected cloud outputs and the transmission timer is stopped. In some embodiments, the timer tracks the time elapsed between the generation and the attempt to access/download the URL. 609, it is determined whether there are more cloud outputs. For example, are there more cloud outputs to transfer related to the client request. In response to there being more cloud outputs, control passes to 610. In response to there not being more cloud outputs, the process ends. In 610, it is determined whether the time for transmission is lower than a fast transfer threshold. In response to the time being lower than the fast transfer threshold, in 612 a next set of cloud outputs is selected larger in size than the set of selected cloud outputs. For example, the selected set of cloud outputs transferred very quickly (e.g., at a time less than a fast transfer threshold), so a larger set of files is selected for the next batch of files to transfer. In response to the time not being lower than the fast transfer threshold, in 614 a next set of cloud outputs is selected that is the same size as the set of selected cloud outputs. For example, the selected set of cloud outputs transferred not very quickly (e.g., at a time more than the fast transfer threshold), so a same size set of files is selected for the next batch of files to transfer. In some embodiments, based on how quickly the client returns to ask for a new batch of results, the download bandwidth is approximated and used to calculate how much data should be sent back in order to saturate that bandwidth. In 616, it is determined whether the time for transmission is higher than a slow transfer threshold. In response to the time being higher than the slow transfer threshold, in 618 a next set of cloud outputs is selected smaller in size than the set of selected cloud outputs. For example, the selected set of cloud outputs transferred very slowly (e.g., at a time more than a slow transfer threshold), so a smaller set of files is selected for the next batch of files to transfer. In response to the time not being higher than the slow transfer threshold, in 620 a next set of cloud outputs is selected that is the same size as the set of selected cloud outputs. For example, the selected set of cloud outputs transferred not very slowly (e.g., at a time less than the slow transfer threshold), so a same size set of files is selected for the next batch of files to transfer.

In some embodiments, client system-cloud storage system interaction for transferring output files comprises:

A. TExecuteStatementReq is the client request used to submit a query. Client system sets the canDownloadResults and candecompressLZ4Result flags inside the TExecuteStatementReq to advertise its ability to handle cloud outputs in compressed format. The client may also set a maximum cloud output file size through maxBytesPerFile.

```
1.    struct TExecuteStatementReq {
2.      //    session identifier
3.      required TSessionHandle sessionHandle... . . .
4.      //    query text
5.      required string statement
6.      ...
7.      //    Set based on the capability to download Arrow results
8.      0x503: optional bool canDownloadResult
9.      //    Set based on the capability to read LZ4 compressed batches
10.     //    Used also for regular Arrow results
11.     0x504: optional bool canDecompressLZ4Result
12.     //    Set the maximum size in bytes of all uncompressed Arrow
13.     //    batches in a file
14.     0x505: optional i64 maxBytesPerFile
15.   }
```

B. Cloud storage system replies to the client system with a GetResultSetMetadata response that sets an enum field denoting the type of RowSet used. When the result type is URL_BASED_SET, the cloud storage system will still incorporate the schema for simplicity. The enum below lists all possible result format types the server can handle: COLUMN_BASED_SET and ROW_BASED_SET are legacy formats always using in-lined outputs. The ARROW_BASED_SET is the current result format for in-line outputs when cloud outputs are not used.

```
1.    enum TRowSetType {
2.      //      expect results in Arrow format
3.      ARROW_BASED_SET = 0,
4.      //      expect results in the columnar Thrift format
5.      COLUMN_BASED_SET = 1,
6.      //      not used, but let's add it for completeness
7.      ROW_BASED_SET = 2,
8.      //      expect downloadable results in Arrow format
9.      URL_BASED_SET = 3
10.   }
```

The results may be returned in compressed format with LZA. The results are homogeneous, either all compressed or uncompressed, as it will be indicated by the TGetResultSetMetadataResp response.

```
1.    struct TGetResultSetMetadataResp {
2.      //  The results are LZ4 compressed only with
           ARROW_BASED_SET and
3.      //  URL_BASED_SET row set types.
4.      0x502: optional bool lz4Compressed;
5.    }
```

C. Client system sends a fetch request setting a number of rows or bytes. On the cloud storage system side, if the protocol is resolved to downloadable results, the number of rows set by the client is ignored in the fetch request.

D. Cloud storage system populates an extra optional field inside TFetchResultsResp that keeps the list of download URLs:

```
1.    struct TSparkArrowBatch {
2.      1:       required binary batch
3.      2:       required i64 rowCount
4.    }
5.
6.    struct TSparkArrowResultLink {
7.      //       the download URL
8.      1:       required string fileLink
9.      //       UTC offset in milliseconds
10.     2:       required i64 expiryTime
11.     //       the row offset in the complete row set
12.     3:       required i64 startRowOffset
13.     //       the total number of rows inside the fileLink
14.     4:       required i64 rowCount
15.     //       the size in bytes of all uncompressed Arrow batches
              in the file
16.     5:       required i64 bytesNum
17.   }
18.
19.   struct TRowSet {
20.     0x501: optional list<TSparkArrowBatch> arrowBatches
21.     //  list of files including a set of consecutive
           Arrow batches (no gaps and no overlaps between files)
22.     0x502: optional list<TSparkArrowResultLink> resultLinks
23.     //  set to true if more links need to be fetched
24.   }
```

E. Client system is not quick enough to download all files, and some URLs expire. In such cases, the client system will send back another fetch request to get new links for the missing files:

Note: The cloud computing system will ignore the orientation, maxRows, maxBytes fields of the TFetchResultsReq. The startRowOffset and the maxBytes fields are used by the cloud computing system for result pagination. A number of URLs is determined based on the requested size in bytes limit of this result batch specified by maxBytes starting from the row offset startRowOffset

```
1.    struct TFetchResultsReq {
2.      0x501: optional i64 maxBytes
3.      // starting offset from which to regenerate links
4.      // this may also be used in the future in other
           types of fetch for
5.      // FETCH_ABSOLUTE
6.      // when URL_BASED_SET is used, orientation, maxRows,
           maxBytes are
```

```
7.      // ignored
8.      0x502: optional i64 startRowOffset
9.   }
```

F. Cloud storage system regenerates links for the missing files and returns similarly as in step D. If the set is large, it may decide to generate only some of these and mark the hasMoreLinks field in the fetch response.

In some embodiments, if one of the download requests fails from the current batch of cloud outputs <b0, b1, b2, b3, . . . >, for example b1, the client system requests refreshes using the startRowOffset field; the server regenerates URLs for batches b1, b2, b3 . . . and returns them to the client system; 2) the client system uses the refreshed URLs to download the missing outputs; 3) the client system requests new URL refreshes for a number of times each time waiting an exponentially increasing amount of time before retrying the request; and 4) the client system also uses a straggler mitigation strategy to identify slow downloads, that is a download that makes slower progress than the median download; in that case, the client system proactively cancels the download request and retries it, in this case without regenerating the URL if it has not expired yet.

Figure 7:
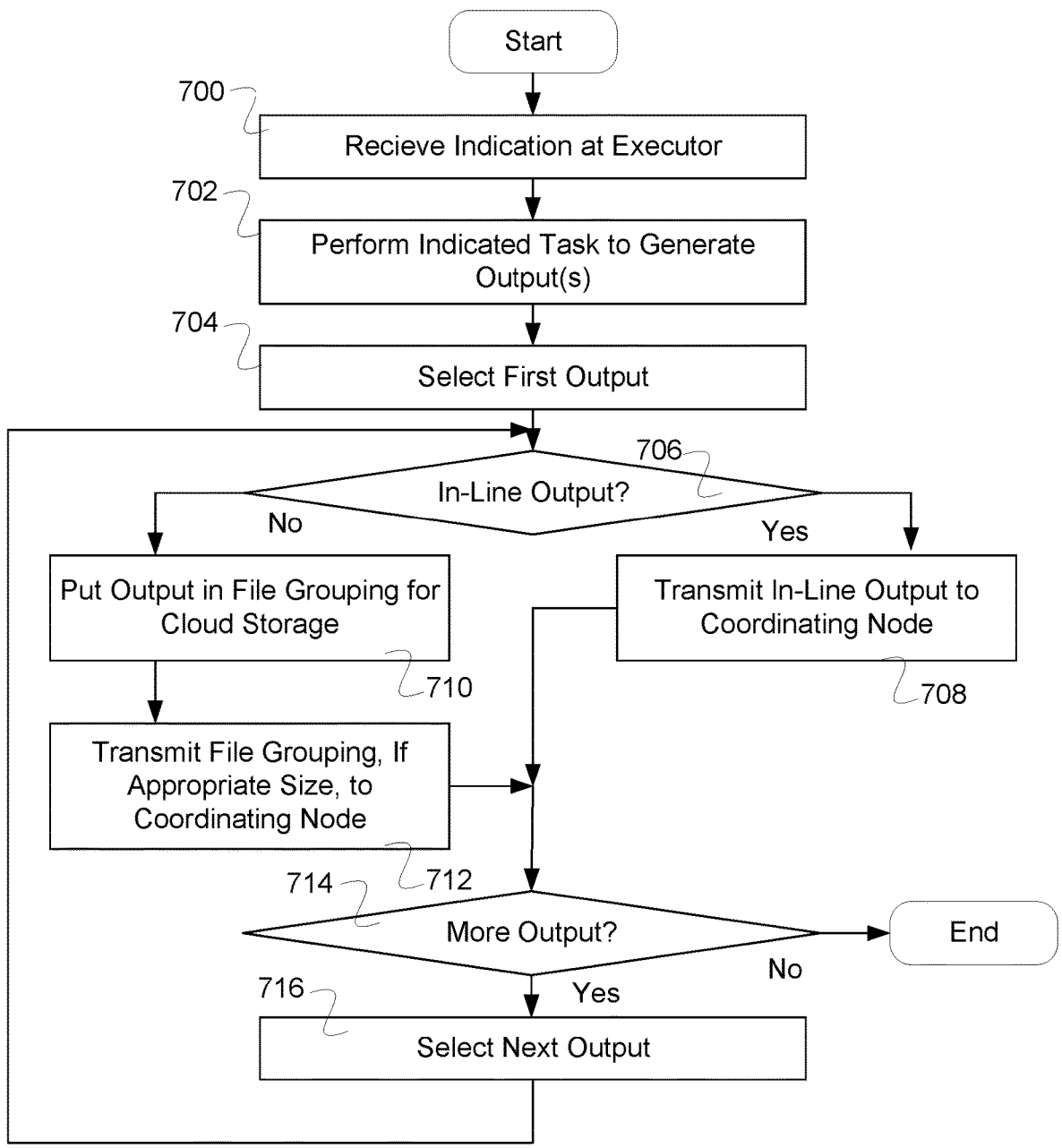
FIG. 7 is a flow diagram illustrating an embodiment of a process for an executor node.

FIG. 7 is a flow diagram illustrating an embodiment of a process for an executor node. In some embodiments, the process of FIG. 7 is executed by an executor node (e.g., executor node 110, executor node 112, executor node 114, executor node 116, etc. of FIG. 1). In the example shown, in 700 an indication is received at an executor. For example, an indication to process a job is received by an executor node from a coordinating node. In 702, an indicated task is performed to generate output(s). For example, a task is performed to complete the processing for the job associated with client request, and one or more outputs are generated. In 704, a first output is selected. In 706, it is determined whether the output comprises an in-line output. For example, the selected output is determined to be a short in-line output (e.g., the indication from the coordinating node designated that the output of the task for the job is an in-line type output). In some embodiments, tasks for jobs that are summary type calculations (e.g., determining a statistic for a large pool of data such as an average, a maximum, a minimum, etc. comprises a summary type calculation) are designated as in-line output type tasks. In response to determining that the output comprises an in-line output, in 708 the in-line output is transmitted to the coordinating node, and control passes to 714. In response to determining that the output does not comprise an in-line output, in 710 an output is put in file grouping for cloud storage. For example, the output is gathered or placed in a file grouping for cloud storage. In 712, the file grouping is transmitted to coordinating node, if appropriate size. For example, once the file grouping is large enough (e.g., is above a target size threshold) then the file is transmitted to the coordinating node. In 714, it is determined whether there is more output. In response to there being more output, in 716 a next output is selected, and control passes to 706. In response to there being no more output, the process ends.

Figure 8:
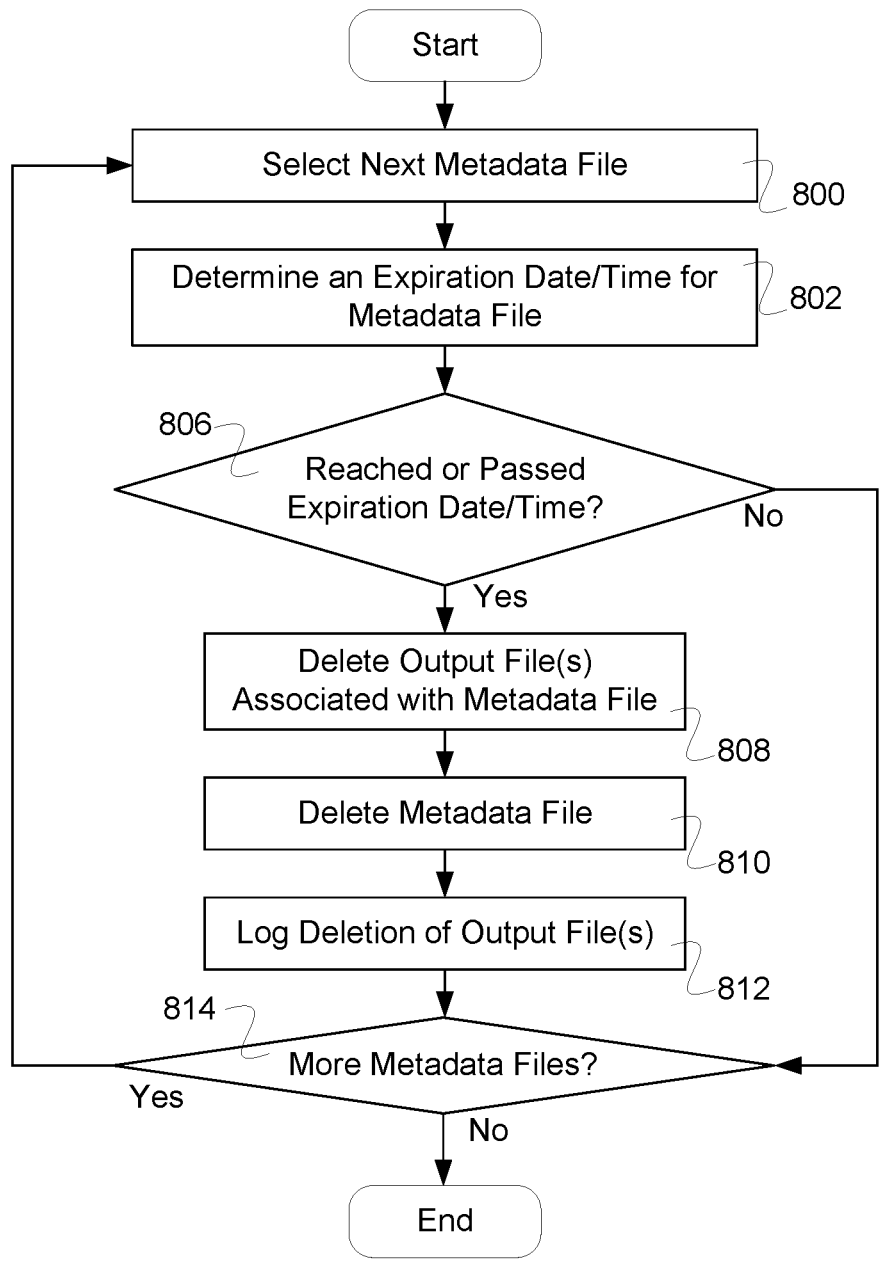
FIG. 8 is a flow diagram illustrating an embodiment of a process for garbage collection.

FIG. 8 is a flow diagram illustrating an embodiment of a process for garbage collection. In some embodiments, the process of FIG. 8 is executed by a cloud storage system (e.g., cloud storage system 118 of FIG. 1). In 800, a next metadata file is selected. For example, a metadata file associated with a client request is selected. In some embodiments, metadata is encoded in the filename (e.g., result/dd/hh<random_uuid>, where the directory/filename includes the term "result", the day, the hour, and a unique identifier). For example, the garbage collection service lists the files on the cloud storage system by day and hour to determine the files that have expired. In 802, determine an expiration date/time for metadata file. In 806, it is determined whether an expiration date has been reached or passed. For example, a metadata file is examined that stores metadata information for data responsive to a specific client request. The metadata file indicates a set of files that store one or more outputs responsive to the client request. The metadata file indicates that the creation data of the output file data is a specific date/time (e.g., Aug. 1, 2021 at 12:04 PM Pacific Time). The system determines from the creation data an expiration date (e.g., a time period after the creation date—for example, a week, a month, a year, etc.). In response to determining that an expiration date has not been reached or passed, control passes to 814. In response to determining that an expiration date has been reached or passed, in 808 the output file(s) associated with the metadata file is/are deleted. For example, output file(s) associated with a metadata file are removed after a time period. In some embodiments, the output file(s) are removed after an indication that the file(s) has/have been transferred—for example, a flag is set in the metadata that the output data has been transferred and the check is not that a time period has been reached or passed, but rather that the indication of having been transferred has been identified in the metadata file. In 810, the metadata file is deleted. For example, a metadata file associated with a client request or associated with one or more cloud output files is deleted. In 812, an indication is logged regarding the deletion of the output file(s). For example, the deletion of the output file(s) and the metadata file is indicated in a log file.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
receiving a request to read a set of query results stored in a cloud based data storage;
transmitting, to a client device, a first batch of the set of query results in response to the request, the first batch of the set of query results being a subset of the set of query results;
monitoring a time of transmission of the first batch of the set of query results;
comparing the time of transmission of the first batch of the set of query results to be received by the client device with transgresses a fast transfer threshold value;
responsive to the comparison indicating that the time of transmission of the first batch is less than the fast transfer threshold value, selecting a second batch of the set of query results, wherein a size of the second batch of the set of query results is greater than the size of the first batch;
transmitting the second batch of the set of query results to the client device;
monitoring the time of transmission of a third batch of the set of query results;
comparing the time of transmission of the third batch of the set of query results to be received by the client device with a slow transfer threshold value;
responsive to the comparison indicating that the time of transmission of the third batch is greater than the slow transfer threshold value, selecting a fourth batch of the set of query results, wherein a size of the fourth batch of the set of query results is less than the size of the third batch; and transmitting the fourth batch of the set of query results to the client device.

2. The method of claim 1, further comprising:
receiving, from the client device, a confirmation message indicating that the first batch of the set of query results has been received by the client device; and
determining the time of transmission of the first batch of the set of query results to be received by the client device based on the confirmation message.

3. The method of claim 1, further comprising:
receiving a client request to generate a query;
generating, with a set of executors, the set of query results based on the query;
storing the set of query results in the cloud based data storage; and
returning metadata indicating a location of the set of query results in response to the client request.

4. The method of claim 3, wherein the request to read the set of query results stored in a cloud based data storage includes the metadata indicating the location of the set of query results.

5. The method of claim 1, wherein monitoring a time of transmission uses a timer to track the time elapsed between a generation and an attempt to access and download batches of files from a cloud storage system.

6. A cloud computation system comprising:
one or more computer processors; and
one or more computer-readable mediums storing instructions that, when executed by the one or more computer processors, cause the cloud computation system to:
receive a request to read a set of query results stored in a cloud based data storage;
transmit, to a client device, a first batch of the set of query results in response to the request, the first batch of the set of query results being a subset of the set of query results;
monitor a time of transmission of the first batch of the set of query results;
compare the time of transmission the first batch of the set of query results to be received by the client device with a fast transfer threshold value;
responsive to the comparison indicating that the time of transmission of the first batch is less than the fast transfer threshold value, select a second batch of the set of query results, wherein a size of the second batch of the set of query results is greater than the size of the first batch;
transmit the second batch of the set of query results to the client device;
monitor the time of transmission of a third batch of the set of query results;
compare the time of transmission of the third batch of the set of query results to be received by the client device with a slow transfer threshold value;
responsive to the comparison indicating that the time of transmission of the third batch is greater than the slow transfer threshold value, select a fourth batch of the set of query results, wherein a size of the fourth batch of the set of query results is less than the size of the third batch; and
transmit the fourth batch of the set of query results to the client device.

7. The cloud computation system of claim 6, wherein the instructions further cause the cloud computation system to:
receive, from the client device, a confirmation message indicating that the first batch of the set of query results has been received by the client device; and
determine the time of transmission of the first batch of the set of query results to be received by the client device based on the confirmation message.

8. The cloud computation system of claim 6, wherein the instructions further cause the cloud computation system to:
receive a client request to generate a query;
generate, with a set of executors, the set of query results based on the query;
store the set of query results in the cloud based data storage; and
return metadata indicating a location of the set of query results in response to the client request.

9. The cloud computation system of claim 8, wherein the request to read the set of query results stored in a cloud based data storage includes the metadata indicating the location of the set of query results.

10. The cloud computation system of claim 8, wherein monitoring a time of transmission uses a timer to track the time elapsed between a generation and an attempt to access and download batches of files from a cloud storage system.

11. A non-transitory computer-readable medium storing instructions that, when executed by one or more computer processors of a cloud computation system, cause the cloud computation system to perform operations comprising:
receive a request to read a set of query results stored in a cloud based data storage;
transmit, to a client device, a first batch of the set of query results in response to the request, the first batch of the set of query results being a subset of the set of query results;
monitor a time of transmission of the first batch of the set of query results;
compare the time of transmission of the first batch of the set of query results to be received by the client device with transgresses a fast transfer threshold value;
responsive to the comparison indicating that the time of transmission of the first batch is less than the fast transfer threshold value, select a second batch of the set of query results, wherein a size of the second batch of the set of query results is greater than the size of the first batch;
transmit the second batch of the set of query results to the client device;
monitor the time of transmission of a third batch of the set of query results;
compare the time of transmission of the third batch of the set of query results to be received by the client device with a slow transfer threshold value;
responsive to the comparison indicating that the time of transmission of the third batch is greater than the slow transfer threshold value, select a fourth batch of the set of query results, wherein a size of the fourth batch of the set of query results is less than the size of the third batch; and
transmit the fourth batch of the set of query results to the client device.

12. The non-transitory computer-readable medium of claim 11, wherein the instructions further cause the cloud computation system to:
receive, from the client device, a confirmation message indicating that the first batch of the set of query results has been received by the client device; and determine the time of transmission of the first batch of the set of query results to be received by the client device based on the confirmation message.

13. The non-transitory computer-readable medium of claim 11, wherein the instructions further cause the cloud computation system to:
receive a client request to generate a query;
generate, with a set of executors, the set of query results based on the query;
store the set of query results in the cloud based data storage; and
return metadata indicating a location of the set of query results in response to the client request, wherein the request to read the set of query results stored in a cloud based data storage includes the metadata indicating the location of the set of query results.

14. The non-transitory computer-readable medium of claim 13, wherein the request to read the set of query results stored in a cloud based data storage includes the metadata indicating the location of the set of query results.

15. The non-transitory computer-readable medium of claim 11, wherein monitoring a time of transmission uses a timer to track the time elapsed between a generation and an attempt to access and download batches of files from a cloud storage system.

* * * * *

UNITED STATES PATENT AND TRADEMARK OFFICE
CERTIFICATE OF CORRECTION

PATENT NO. : 12,399,901 B2
APPLICATION NO. : 18/614380
DATED : August 26, 2025
INVENTOR(S) : Ghit et al.

Page 1 of 1

It is certified that error appears in the above-identified patent and that said Letters Patent is hereby corrected as shown below:

In the Claims

In Column 16, in Claim 1, Line 52, after "with" delete "transgresses".

In Column 18, in Claim 11, Line 40, after "with" delete "transgresses".

Signed and Sealed this
Twenty-first Day of October, 2025

John A. Squires
*Director of the United States Patent and Trademark Office*